US012504712B2

(12) United States Patent
Kim et al.

(10) Patent No.: US 12,504,712 B2
(45) Date of Patent: Dec. 23, 2025

(54) PROCESS CARTRIDGE WITH DRIVING SIDE HINGE WITH HINGE SPACING

(71) Applicant: Hewlett-Packard Development Company, L.P., Spring, TX (US)

(72) Inventors: JinHong Kim, Seongnam-si (KR); YunKyu Shim, Seongnam-si (KR); SungJin Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/844,382

(22) PCT Filed: Sep. 12, 2022

(86) PCT No.: PCT/US2022/043186
§ 371 (c)(1),
(2) Date: Sep. 5, 2024

(87) PCT Pub. No.: WO2023/183020
PCT Pub. Date: Sep. 28, 2023

(65) Prior Publication Data
US 2025/0231524 A1 Jul. 17, 2025

(30) Foreign Application Priority Data
Mar. 21, 2022 (KR) ........................ 10-2022-0034437

(51) Int. Cl.
*G03G 21/18* (2006.01)
*G03G 21/16* (2006.01)

(52) U.S. Cl.
CPC ..... *G03G 21/1825* (2013.01); *G03G 21/1647* (2013.01); *G03G 21/1814* (2013.01); *G03G 21/186* (2013.01); *G03G 2221/1606* (2013.01); *G03G 2221/163* (2013.01); *G03G 2221/1657* (2013.01)

(58) Field of Classification Search
CPC ........... G03G 21/1647; G03G 21/1671; G03G 21/1676; G03G 21/1814; G03G 21/1825; G03G 21/186; G03G 2221/1606; G03G 2221/163; G03G 2221/1657
See application file for complete search history.

(56) References Cited

U.S. PATENT DOCUMENTS 5,583,618 A 12/1996 Takeuchi et al.
2012/0321342 A1* 12/2012 Mori .................. G03G 21/1825 399/111

FOREIGN PATENT DOCUMENTS

| | | | |
|---|---|---|---|
| EP | 2721448 | A2 | 4/2014 |
| JP | 61-050123 | B2 | 11/1986 |
| JP | 2007-108262 | A | 4/2007 |
| JP | 2020-052358 | A | 4/2020 |
| WO | 2012/173216 | A2 | 12/2012 |
| WO | 2020/066091 | A1 | 4/2020 |

* cited by examiner

*Primary Examiner* — Sophia S Chen
(74) *Attorney, Agent, or Firm* — Foley & Lardner LLP

(57) ABSTRACT

An example process cartridge includes a developing unit, a photosensitive unit, and a hinge to connect the developing unit to the photosensitive unit to be pivotable between a direction in which a developing roller approaches a photosensitive drum and a direction in which the developing roller separates from the photosensitive drum. The hinge includes a driving-side hinge to connect driving ends of the photosensitive unit and the developing unit to be pivotable. The driving-side hinge has a spacing.

14 Claims, 10 Drawing Sheets

PROCESS CARTRIDGE WITH DRIVING SIDE HINGE WITH HINGE SPACING

CROSS-REFERENCE TO RELATED APPLICATIONS

This application is a US National Stage Entry under 35 U.S.C. § 371 of International Application No.: PCT/US2022/043186 filed Sep. 12, 2022, which claims priority to Korean Patent Application No. 10-2022-0034437, filed Mar. 21, 2022, which are hereby incorporated by reference in their entireties.

BACKGROUND

An electrophotographic image forming apparatus may form a visible toner image on a photoconductor by providing toner to an electrostatic latent image formed on the photoconductor, transfer the toner image to a print medium through an intermediate transfer medium or directly to the print medium, and fix the transferred toner image on the print medium.

A process cartridge may supply toner to the electrostatic latent image formed on the photoconductor to form a visible toner image. Based on the lifespan of the process cartridge ending, the process cartridge may be removed from a main body of an image forming apparatus, and a new process cartridge may be mounted on the main body. The process cartridge may include a photosensitive unit including a photosensitive drum, and a developing unit including a developing roller. The developing roller may be spaced apart from the photosensitive drum by a developing gap.

BRIEF DESCRIPTION OF THE DRAWINGS

Various examples will be described below by referring to the following figures.

DETAILED DESCRIPTION

Figure 1:
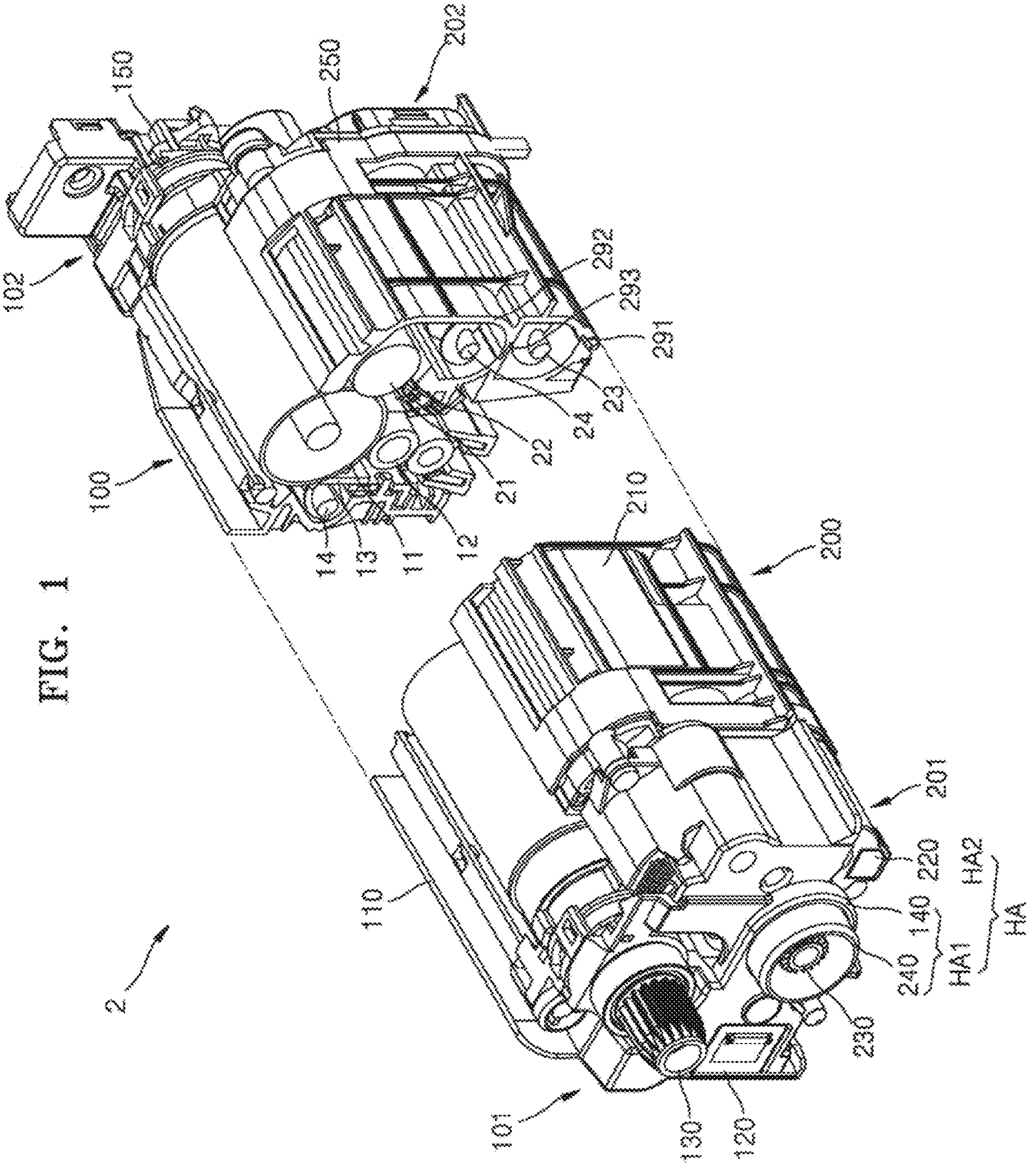
FIG. 1 is a schematic partially cutaway perspective view of a process cartridge according to an example.

An example image forming apparatus may include a replaceable process cartridge. The process cartridge may include a photosensitive drum and a developing roller. The process cartridge may be attached to or detached from a main body of the image forming apparatus. The process cartridge may include a photosensitive unit including the photosensitive drum, and a developing unit including the developing roller. The developing unit may be pivoted between a direction in which the developing roller approaches the photosensitive drum and a direction in which the developing roller separates from the photosensitive drum. The process cartridge may include a first position determining unit and at least one driven coupler. Based on the process cartridge being mounted on the main body of the image forming apparatus, the first position determining unit may be connected to a second position determining unit provided in the main body, and the at least one driven coupler may be connected to at least one driving coupler provided in the main body of the image forming apparatus and receive rotation power. The photosensitive drum and the developing roller may be connected to the at least one driven coupler and may be rotated. Based on a relative position of a driven coupler with respect to the first position determining unit and a relative position of a driving coupler with respect to the second position determining unit not being the same, the driven coupler and the driving coupler may be connected to each other out of alignment, such that transmission of rotation power from the main body to the process cartridge may be non-uniform. Non-uniform transmission of the rotation power may cause, e.g., non-uniform rotation of the developing roller, which may be a factor in image quality deterioration. The driven coupler or the driving coupler may be damaged during a process of attaching and detaching the process cartridge.

A process cartridge according to an example includes a hinge having a spacing as a hinge that connects the developing unit and the photosensitive unit to be pivotable. The hinge may include a support hole, and a support shaft coupled to the support hole to be pivotable. In an example, having a spacing indicates that a gap beyond a normal tolerance range exists between the support hole and the support shaft which constitute the hinge. Based on a discrepancy existing between the relative position of the driven coupler with respect to the first position determining unit and the relative position of the driving coupler with respect to the second position determining unit, the support shaft and the support hole move relative to each other within a range of the spacing, and accordingly, a positional discrepancy may be compensated for.

The hinge may include a driving-side hinge and a non-driving-side hinge. In an example, the driving-side hinge may be a hinge having a spacing, and the non-driving-side hinge may be a hinge without a spacing. In another example, both the driving-side hinge and the non-driving-side hinge may be hinges having spacings. The driving-side hinge and the non-driving-side hinge may be coaxial. The driving-side hinge may be located on a driving-end side at which the driven coupler may be arranged from among two opposite sides of the process cartridge in a longitudinal direction. The driving-side hinge may connect driving ends of the developing unit and the photosensitive unit to be pivotable. The non-driving-side hinge may be located on a non-driving-end side at which the driven coupler is not arranged from two opposite sides of the process cartridge in the longitudinal direction. The non-driving-side hinge may connect non-driving ends of the developing unit and the photosensitive unit to be pivotable.

The driven coupler may include a developing coupler provided at a driving end of the developing unit. The driving-side hinge may be coaxial with the developing coupler. The driving-side hinge may include a support hole in a driving end of the photosensitive unit and a support shaft, provided at the driving end of the developing unit, to be inserted into the support hole to be pivotable. The support shaft may be coaxial with the developing coupler and may have a cylindrical shape surrounding the developing coupler. The support shaft may function as the aforementioned first position determining unit, and a positional error between a relative position of the developing coupler with respect to the first position determining unit and a relative position of the driving coupler with respect to the second position determining unit may be minimized.

An elastic member may elastically bias the developing unit to be pivotable in a direction in which the developing roller approaches the photosensitive drum. A first gap maintaining member may be provided at each of two opposite ends of the photosensitive drum. A second gap maintaining member that faces the first gap maintaining member to maintain a gap between the photosensitive drum and the developing roller may be provided at each of two opposite ends of the developing roller. Based on the developing unit being moved within a range of the spacing with respect to the photosensitive unit by the spacing of the hinge, the elastic member and the first and second gap maintaining members may maintain a constant gap (e.g., a developing gap) between the developing roller and the photosensitive drum. Hereinafter, examples of the process cartridge and the image forming apparatus are described with reference to the accompanying drawings. In the drawings, the same reference numerals refer to the same components, and the size or thickness of each component may be exaggerated for the clarity of description.

FIG. 1 is a schematic partially cutaway perspective view of a process cartridge 2 according to an example. Referring to FIG. 1, the process cartridge 2 may include a photosensitive unit 100 and a developing unit 200. The photosensitive unit 100 may include a driving end, a non-driving end, and a photosensitive drum 11. The developing unit 200 may include a driving end, a non-driving end, and a developing roller 21. The driving end refers to an end at which a rotation power receiving member to receive rotation power from a main body 1 (see FIG. 10) of the image forming apparatus may be arranged from among two opposite ends of the process cartridge 2 in a longitudinal direction. The non-driving end refers to an end at which the rotation power receiving member is not arranged. Hereinafter, the driving end and the non-driving end of the photosensitive unit 100 refer to a first driving end 101 and a first non-driving end 102, respectively. The driving end and the non-driving end of the developing unit 200, respectively corresponding to the first driving end 101 and the first non-driving end 102, refer to a second driving end 201 and a second non-driving end 202, respectively. A hinge HA connects the developing unit 200 to the photosensitive unit 100 to be pivotable between a direction in which the developing roller 21 approaches the photosensitive drum 11 and a direction in which the developing roller 21 separates from the photosensitive drum 11. The hinge HA may include a driving-side hinge HA1 that connects the first driving end 101 to the second driving end 201 to be pivotable. The driving-side hinge HA1 may include a spacing.

The photosensitive unit 100 includes a first frame 110. The photosensitive drum 11 is supported on the first frame 110 to be rotatable. The first frame 110 may include a first driving side bracket 120 positioned at the first driving end 101, and a first non-driving side bracket 150 positioned at the first non-driving end 102. The photosensitive drum 11 is an example of a photoconductor on which an electrostatic latent image may be formed. A charging roller 12 is to charge the surface of the photosensitive drum 11 to a uniform electric potential. A cleaning blade 13 is to remove a foreign substance such as waste toner remaining on the surface of the photosensitive drum 11 after a transfer process, an example of which is described below. The foreign substance removed from the surface of the photosensitive drum 11 may be conveyed to a waste toner containing member (not shown) by a waste toner conveying member 14.

The developing unit 200 may include a second frame 210. The developing roller 21 may be supported on the second frame 210 to be rotatable. The second frame 210 may include a second driving side bracket 220 positioned at the second driving end 201, and a second non-driving side bracket 250 positioned at the second non-driving end 202. An internal space of the second frame 210 may be divided into an agitating chamber 291 and a developing chamber 292 by a partition wall 293. A communicating port (not shown) that communicates the agitating chamber 291 to the developing chamber 292 may be provided at each of two opposite ends of the partition wall 293 in a longitudinal direction. A first conveying member 23 and a second conveying member 24 to convey a developer (e.g., toner and carrier) may be provided in the agitating chamber 291 and the developing chamber 292, respectively. The first and second conveying members 23 and 24 are to convey the developer in opposite directions. The first and second conveying members 23 and 24 may be, e.g., augers. The developing roller 21 may be mounted in the developing chamber 292. The developer may be circulated along a circulation path formed by the agitating chamber 291, the communicating port, and the developing chamber 292, and the developer may be supplied from the developing chamber 292 to the developing roller 21. The developing roller 21 faces the photosensitive drum 11 while maintaining a developing gap. By a developing bias voltage applied between the developing roller 21 and the photosensitive drum 11, toner may be supplied from the developing roller 21 to the electrostatic latent image formed on the surface of the photosensitive drum 11 across the developing gap, such that the electrostatic latent image is developed into a visible toner image. A thickness of a developer layer attached to the outer circumference of the developing roller 21 and supplied to the developing gap may be regulated by a regulating blade 22.

Figure 2:
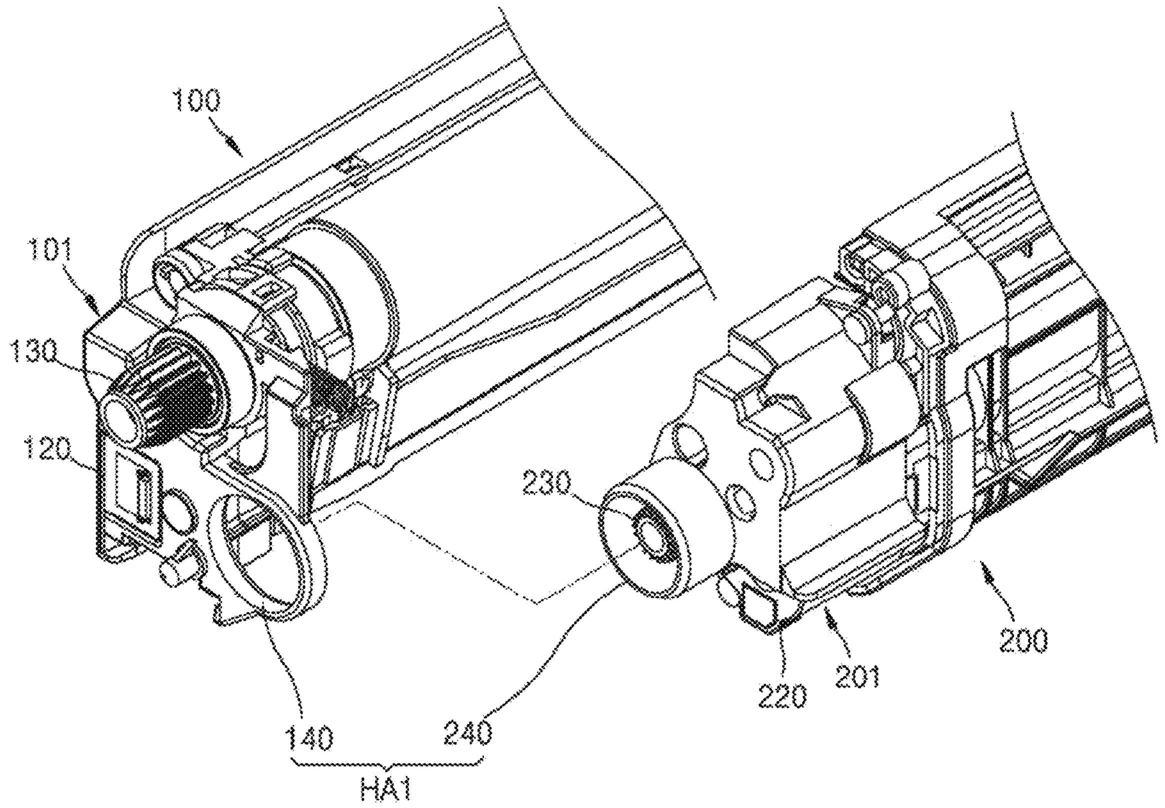
FIG. 2 is a partially exploded perspective view illustrating a driving-side hinge according to an example.
Figure 3:
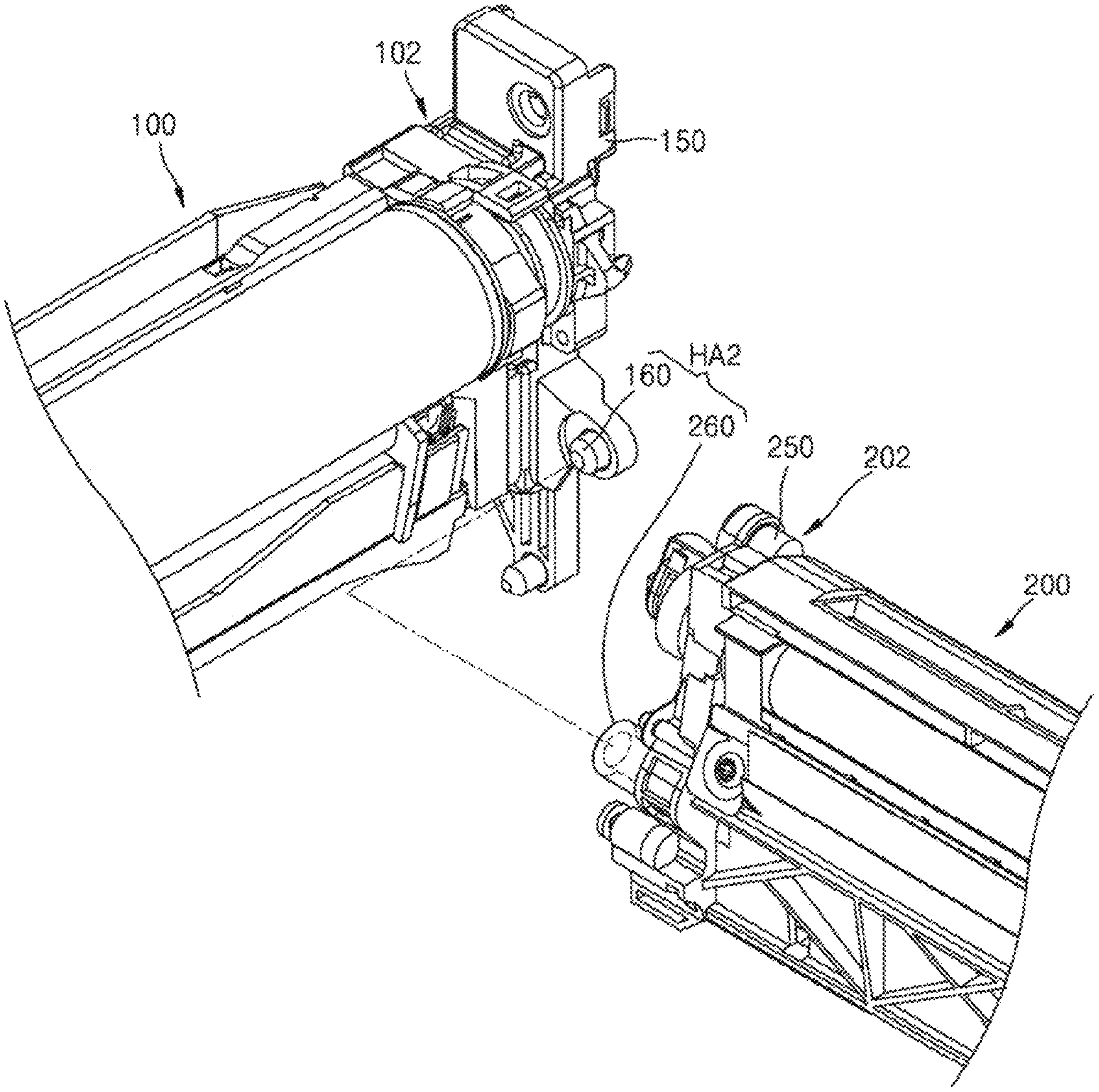
FIG. 3 is a partially exploded perspective view illustrating a non-driving-side hinge according to an example.

The developing unit 200 may be connected to the photosensitive unit 100 by the hinge HA to be pivotable. FIG. 2 is a partially exploded perspective view illustrating a driving-side hinge according to an example. FIG. 3 is a partially exploded perspective view illustrating a non-driving-side hinge according to an example. Referring to FIGS. 1 to 3, the hinge HA may include the driving-side hinge HA1 and a non-driving-side hinge HA2. The driving-side hinge HA1 is a hinge on a driving-end side at which the rotation power receiving member, e.g., a driven coupler, is arranged from among two opposite sides of the process cartridge 2 in a longitudinal direction. The driving-side hinge HA1 is to connect the first and second driving ends 101 and 201 of the photosensitive unit 100 and the developing unit 200 to be pivotable. The non-driving-side hinge HA2 is a hinge on a non-driving-end side at which the driven coupler is not arranged from among two opposite sides of the process cartridge 2 in the longitudinal direction. The non-driving-side hinge HA2 is to connect the first and second non-driving ends 102 and 202 of the photosensitive unit 100 and the developing unit 200 to be pivotable.

The driven coupler may include a developing coupler 230 provided in the developing unit 200. The developing coupler 230 may be connected to rotation members, e.g., the developing roller 21 and the first and second conveying members 23 and 24, of the developing unit 200. For example, the developing coupler 230 may be connected to the developing roller 21 and the first and second conveying members 23 and 24 by a gear connection structure. The driven coupler may include a photosensitive coupler 130 provided in the photosensitive unit 100. The photosensitive coupler 130 may be connected to rotation members, e.g., the photosensitive drum 11, the charging roller 12, and the waste toner conveying member 14, of the photosensitive unit 100. For example, the photosensitive coupler 130 may be coaxial with the photosensitive drum 11. The photosensitive coupler 130 may be coupled to one end of the photosensitive drum 11. The photosensitive coupler 130 may be connected to the charging roller 12 and the waste toner conveying member 14 by, e.g., a gear connection structure.

Referring to FIGS. 1 and 2, the driving-side hinge HA1 may include a first support hole 140 in the first driving end 101, e.g., the first driving side bracket 120, and a first support shaft 240 provided at the second driving end 201, e.g., the second driving side bracket 220. The first support shaft 240 may be inserted into the first support hole 140 to be pivotable. The driving-side hinge HA1 may include a spacing. A hinge may be implemented by combining a hole and a shaft. Nominal dimensions of an inner diameter of the hole and an outer diameter of the shaft are the same in design, and it is managed so that the hole has a (+) tolerance, the shaft has a (−) tolerance, or the hole and the shaft have (+) and (−) tolerances, respectively. In this case, it is stated that the hinge has no spacing. Having a spacing indicates that a gap beyond a normal tolerance range exists between the first support hole 140 and the first support shaft 240 which constitute the driving-side hinge HA1.

As an example, the spacing may be 0.1 mm or more. A difference between an inner diameter of the first support hole 140 and an outer diameter of the first support shaft 240 may be 0.2 mm or more. That is, the inner diameter of the first support hole 140 is greater than the outer diameter of the first support shaft 240 by 0.2 mm or more. Accordingly, a spacing of 0.1 mm or more may be secured between the first support shaft 240 and the first support hole 140. As an example, the spacing may be 0.6 mm or less. The difference between the inner diameter of the first support hole 140 and the outer diameter of the first support shaft 240 may be 1.2 mm or less. That is, the inner diameter of the first support hole 140 is not greater than the outer diameter of the first support shaft 240 by 1.2 mm or more. Accordingly, a spacing of 0.6 mm or less may be secured between the first support shaft 240 and the first support hole 140. Based on the spacing being less than 0.1 mm, it is difficult to correct a positional discrepancy between a relative position of a driven coupler with respect to a first position determining unit and a relative position of a driving coupler with respect to a second position determining unit, which will be described below. Based on the spacing being 0.6 mm or more, the developing unit 200 may be too loosely connected to the photosensitive unit 100. Based on the process cartridge 2 being mounted on a main body 1 (see FIG. 4) of the image forming apparatus, the driven coupler and the driving coupler may be engaged with each other. Based on the spacing being 0.6 mm or more, a shaft misalignment between the driven coupler and the driving coupler is excessively large. Accordingly, in response to the driven coupler and the driving coupler being engaged with each other, shock, noise, and the like may occur, and the driven coupler and/or the driving coupler may be damaged. The process cartridge 2 is a consumable and may be separately distributed from the main body 1 (see FIG. 4) of the image forming apparatus. Based on the spacing being 0.6 mm or more, the developing unit 200 and the photosensitive unit 100 are loosely combined with each other, such that a relative vibration width of the developing unit 200 with respect to the photosensitive unit 100 or a relative vibration width of the photosensitive unit 100 with respect to the developing unit 200 is increased by vibration in a distribution process. This may cause damage to a combining area of the developing unit 200 and the photosensitive unit 100, leakage of toner inside the developing unit 200, etc. Also, in a case where the non-driving-side hinge HA2 has no spacing, based on the spacing of the driving-side hinge HA1 being 0.6 mm or more, torsion of the non-driving-side hinge HA2 may be increased. Accordingly, the stability of the non-driving-side hinge HA2 may be affected, and there is a risk that the non-driving-side hinge HA2 may be damaged.

The first support shaft 240 may be coaxial with the developing coupler 230. For example, the first support shaft 240 may have a cylindrical shape surrounding the developing coupler 230. The developing coupler 230 may be positioned inside the first support shaft 240.

Referring to FIG. 3, the non-driving-side hinge HA2 may include a second support shaft 160 provided at the first non-driving end 102, e.g., the first non-driving side bracket 150, and a second support hole 260 in the second non-driving end 202, e.g., the second non-driving side bracket 250. The second support shaft 160 may be inserted into the second support hole 260 to be pivotable. The non-driving-side hinge HA2 may have no spacing. Having no spacing indicates that nominal dimensions of an outer diameter of the second support shaft 160 and an inner diameter of the second support hole 260 are the same in design, and it is managed so that the second support hole 260 has a (+) tolerance, the second support shaft 160 has a (−) tolerance, or the second support hole 260 and the second support shaft 160 have (+) and (−) tolerances, respectively, and accordingly, a gap exists between the second support hole 260 and the second support shaft 160 within a normal tolerance range. The spacing of the non-driving-side hinge HA2 may be 0.1 mm or less. For example, the inner diameter of the second support hole 260 may be not greater than the outer diameter of the second support shaft 160 by 0.2 mm or more.

The non-driving-side hinge HA2 may be coaxial with the driving-side hinge HA1. In other words, the first support hole 140 and the second support shaft 160 may be coaxial, and the first support shaft 240 and the second support hole 260 may be coaxial. The non-driving-side hinge HA2 may also not be coaxial with the driving-side hinge HA1. Although not shown in the drawings, the non-driving-side hinge HA2 may include a second support hole in the first non-driving end 102, e.g., the first non-driving side bracket 150, and a second support shaft provided at the second non-driving end 202, e.g., the second non-driving side bracket 250.

Figure 4:
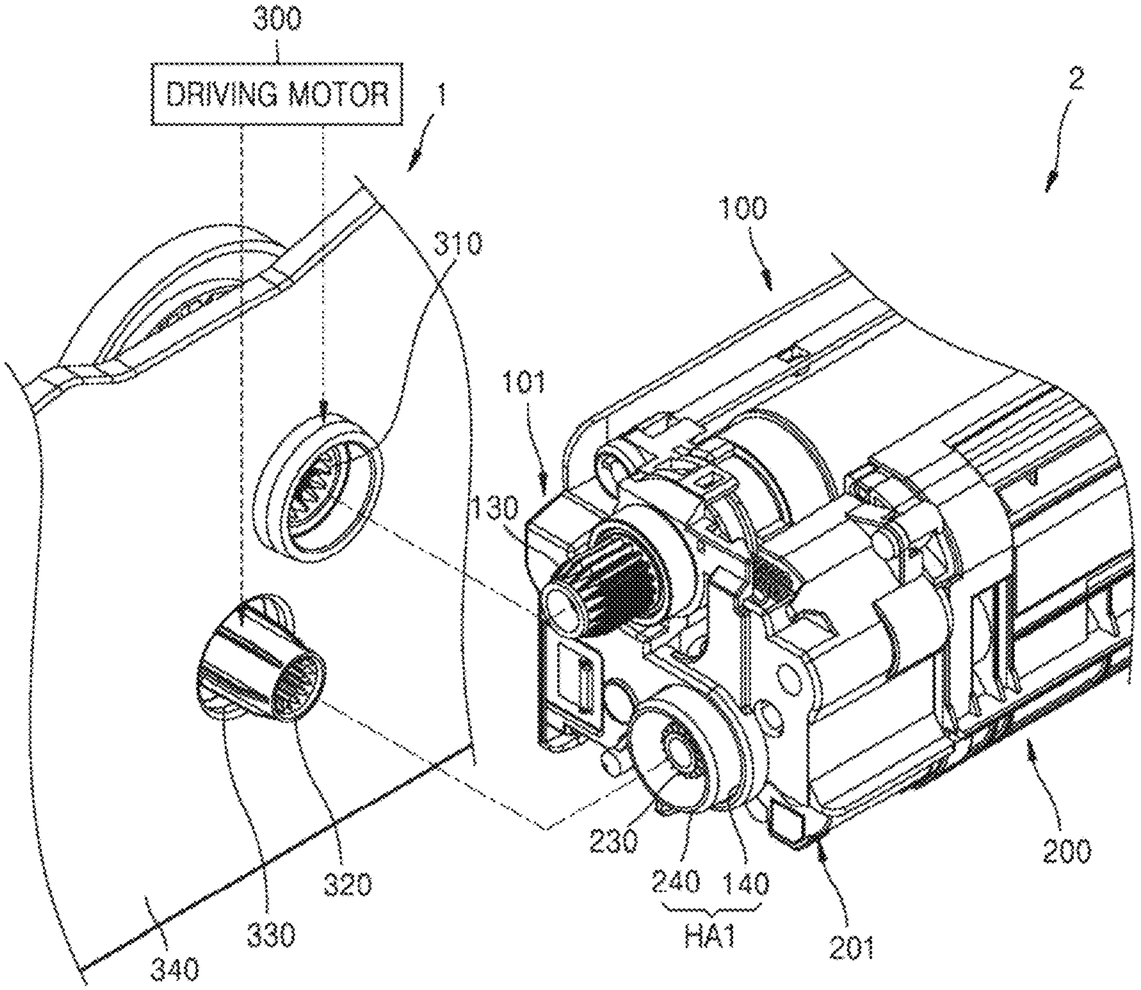
FIG. 4 is a partially exploded perspective view illustrating an operation of a process cartridge according to an example.
Figure 5:
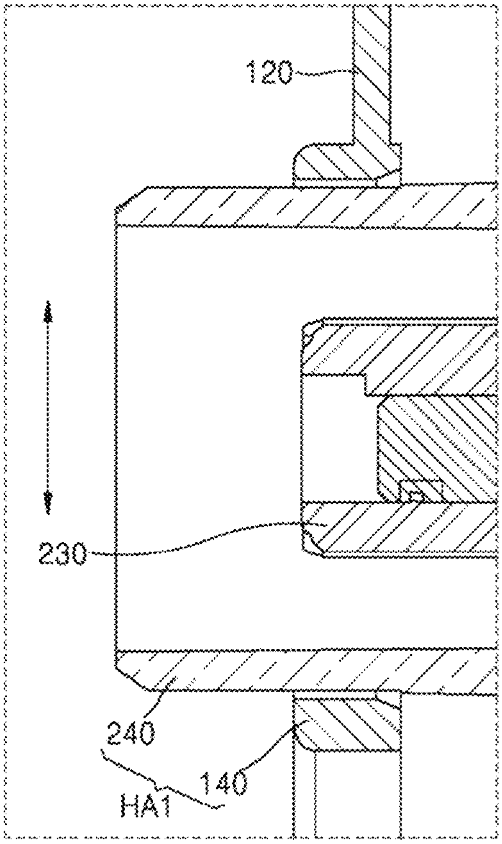
FIG. 5 is a cross-sectional view of a driving-side hinge according to an example.

FIG. 4 is a partially exploded perspective view illustrating an operation of the process cartridge 2 according to an example. FIG. 5 is a cross-sectional view of the driving-side hinge HA1 according to an example. Referring to FIGS. 4 and 5, based on the process cartridge 2 being mounted on the main body 1 of the image forming apparatus, the driving-side hinge HA1 may be aligned with a position determining unit 330. The first support shaft 240 may be a reference (i.e., the first position determining unit) for determining a position of the process cartridge 2 in the main body 1 based on the process cartridge 2 being mounted on the main body 1 of the image forming apparatus. For example, the position determining unit 330 (i.e., the second position determining unit) into which the first support shaft 240 may be inserted may be provided in the main body 1 of the image forming apparatus. The position determining unit 330 may be, e.g., a position determining hole into which the first support shaft 240 may be inserted. A first driving coupler 310 and a second driving coupler 320 may be provided in the main body 1. The first driving coupler 310 and the second driving coupler 320 may be rotated by, e.g., a driving motor 300 provided in the main body 1. The first driving coupler 310 and the second driving coupler 320 correspond to the photosensitive coupler 130 and the developing coupler 230 of the process cartridge 2, respectively. The second driving coupler 320 may be coaxially positioned with the position determining unit 330.

Based on the process cartridge 2 being mounted on the main body 1, the first support shaft 240 may be inserted into the position determining unit 330. The second driving coupler 320 may be aligned and engaged with the developing coupler 230, and the first driving coupler 310 may be engaged with the photosensitive coupler 130. Relative positions of the photosensitive coupler 130 and the developing coupler 230 with respect to the first support shaft 240 are associated with relative positions of the first and second driving couplers 310 and 320 with respect to the position determining unit 330 provided in the main body 1. The relative positions of the photosensitive coupler 130 and the developing coupler 230 with respect to the first support shaft 240 depend on the manufacturing precision of parts such as the first frame 110, the first driving side bracket 120, the second frame 210, the second driving side bracket 220, etc. The relative positions of the first and second driving couplers 310 and 320 with respect to the position determining unit 330 depend on the manufacturing precision of a driving bracket 340 in which the position determining unit 330 may be provided, and the assembly precision of the first and second driving couplers 310 and 320 with respect to the driving bracket 340. In an example in which the driving bracket 340 is manufactured by metal press working, it is easy to manage the manufacturing precision. Based on the first frame 110, the first driving side bracket 120, the second frame 210, and the second driving side bracket 220 being manufactured by plastic injection molding, it is not easy to manufacture the first frame 110, the first driving side bracket 120, the second frame 210, and the second driving side bracket 220 with high precision, and it may not also be easy to maintain uniform manufacturing precision during a mass production process.

According to an example, the first support shaft 240 may be coaxial with the developing coupler 230, and the position determining unit 330 may be coaxial with the second driving coupler 320. Therefore, there is substantially no discrepancy between a relative position of the developing coupler 230 with respect to the first support shaft 240 and a relative position of the second driving coupler 320 with respect to the position determining unit 330. Accordingly, based on a discrepancy existing between a relative position of the photosensitive coupler 130 with respect to the first support shaft 240 and a relative position of the first driving coupler 310 with respect to the position determining unit 330, the discrepancy should be compensated for.

Figure 6:
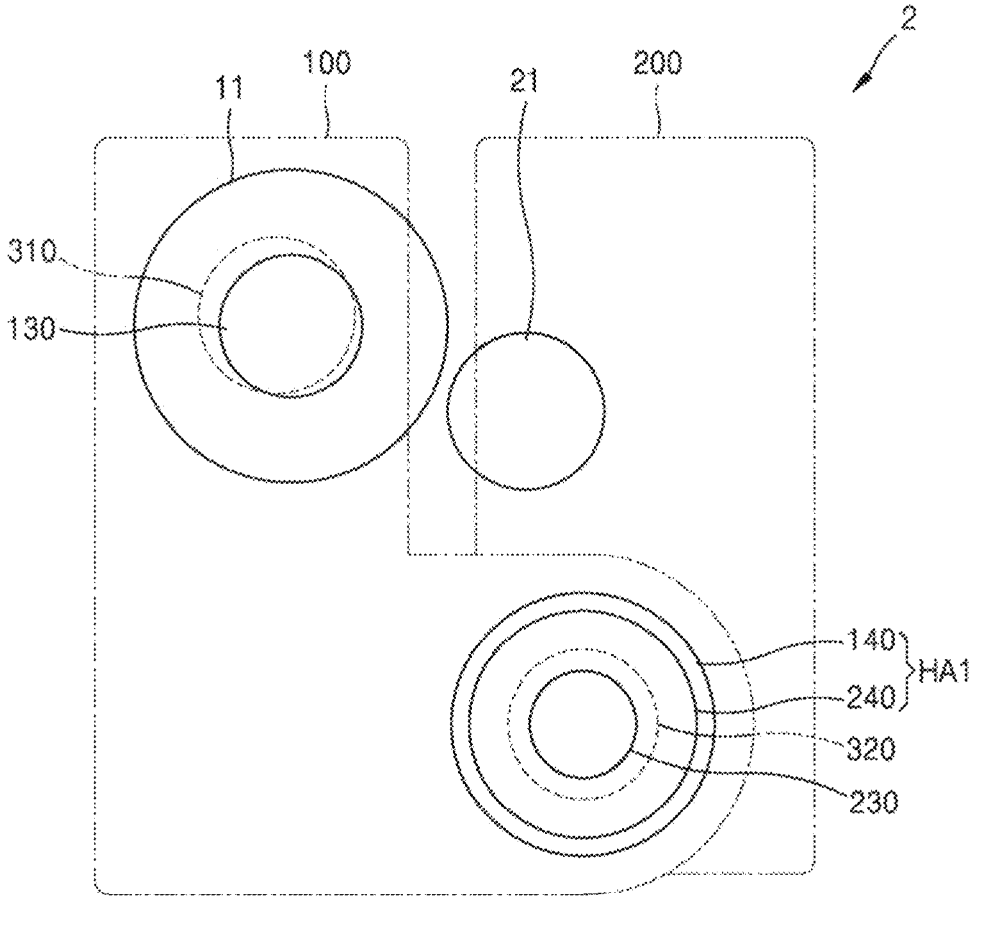
FIG. 6 is a schematic side view illustrating a case where a discrepancy exists between a relative position of a photosensitive coupler with respect to a first support shaft and a relative position of a first driving coupler with respect to a position determining unit.

FIG. 6 is a schematic side view illustrating a case where a discrepancy exists between a relative position of the photosensitive coupler 130 with respect to the first support shaft 240 and a relative position of the first driving coupler 310 with respect to the position determining unit 330. Referring to FIG. 6, in response to the process cartridge 2 being mounted on the main body 1, the first support shaft 240 may be inserted into the position determining unit 330. Because the first support shaft 240 and the developing coupler 230 are coaxial, and the position determining unit 330 and the second driving coupler 320 are coaxial, in response to the first support shaft 240 being inserted into the position determining unit 330, the second driving coupler 320 may be aligned and engaged with the developing coupler 230. There may be a discrepancy between the relative position of the photosensitive coupler 130 with respect to the first support shaft 240 and the relative position of the first driving coupler 310 with respect to the position determining unit 330. Based on the driving-side hinge HA1 having no spacing, the first driving coupler 310 and the photosensitive coupler 130 may be misaligned with each other, and accordingly, the first driving coupler 310 and the photosensitive coupler 130 may be tightly engaged or may interfere with each other during an engagement process. Thus, the first driving coupler 310 and the photosensitive coupler 130 may be damaged. Based on the first driving coupler 310 and the photosensitive coupler 130 being tightly engaged with each other, the first driving coupler 310 and the photosensitive coupler 130 may be rotated while rotation shafts thereof are misaligned with each other, and thus, rotation power of the first driving coupler 310 may be non-uniformly transmitted to the photosensitive coupler 130. Based on the photosensitive drum 11 being rotated, jitter may occur. Non-uniform rotations of the first driving coupler 310 and the photosensitive coupler 130 may cause other rotation members, e.g., the charging roller 12 and the waste toner conveying member 14, to be non-uniformly rotated, such that rotation noise, rotation shock, and the like may be caused. Tight engagement between the first driving coupler 310 and the photosensitive coupler 130 also affect engagement between the second driving coupler 320 and the developing coupler 230, and thus may cause rotation jitter of rotation members of the developing unit 200. Jitter may be a factor that deteriorates image quality.

Figure 7:
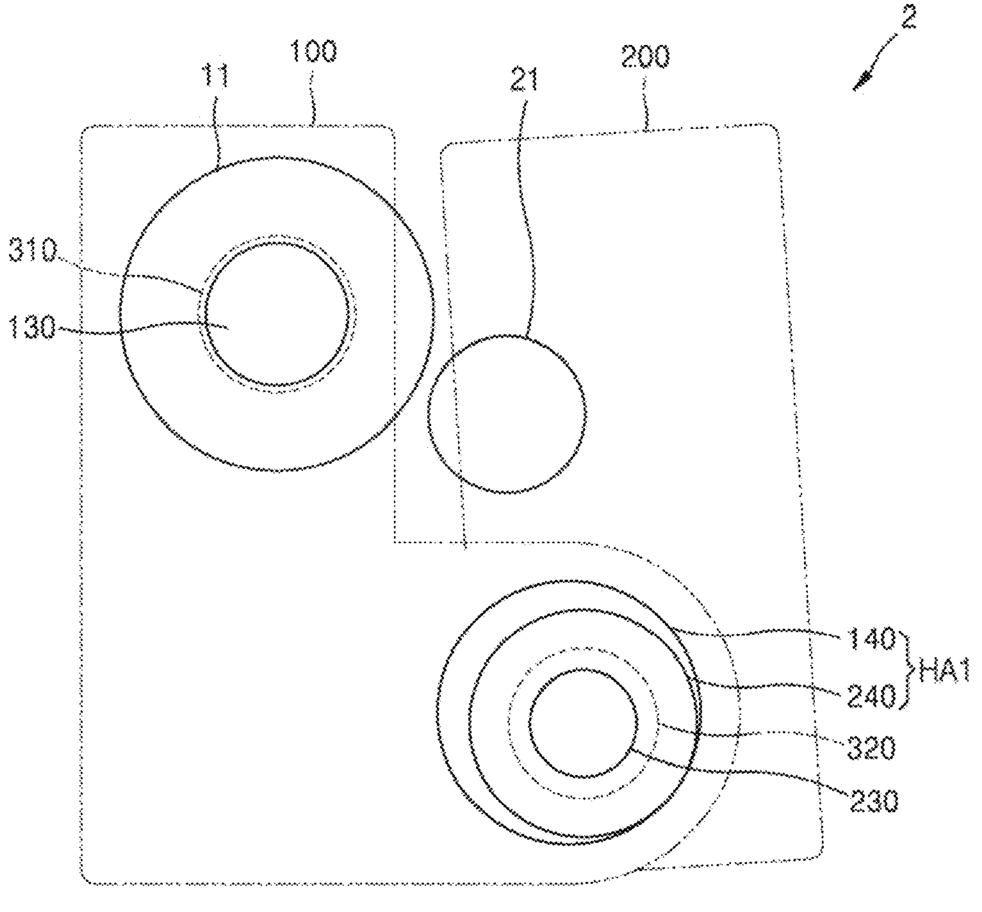
FIG. 7 illustrates a state in which a discrepancy between a relative position of a photosensitive coupler with respect to a first support shaft and a relative position of a first driving coupler with respect to a position determining unit is compensated for by a spacing of a driving-side hinge according to an example.

According to an example process cartridge 2, as shown in FIG. 5, the driving-side hinge HA1 has a spacing. FIG. 7 illustrates a state in which a discrepancy between a relative position of the photosensitive coupler 130 with respect to the first support shaft 240 and a relative position of the first driving coupler 310 with respect to the position determining unit 330 is compensated for by a spacing of the driving-side hinge HA1 according to an example. Referring to FIG. 7, based on a discrepancy existing between a relative position of the photosensitive coupler 130 with respect to the first support shaft 240 and a relative position of the first driving coupler 310 with respect to the position determining unit 330, the photosensitive unit 100 may be moved with respect to the driving-side hinge HA1, e.g., the first support shaft 240, within a spacing-allowed range. Accordingly, the discrepancy between the relative position of the photosensitive coupler 130 with respect to the first support shaft 240 and the relative position of the first driving coupler 310 with respect to the position determining unit 330 may be compensated. Because the first driving coupler 310 and the photosensitive coupler 130 are aligned and stably engaged with each other, rotation power of the first driving coupler 310 may be stably transmitted to the photosensitive coupler 130. Occurrence of jitter may be suppressed, and stable image quality may be obtained. Also, the demand for precision management is not high for parts manufactured by plastic injection molding, such as the first frame 110, the first driving side bracket 120, the second frame 210, and the second driving side bracket 220, and thus, mass productivity may improve.

Figure 8:
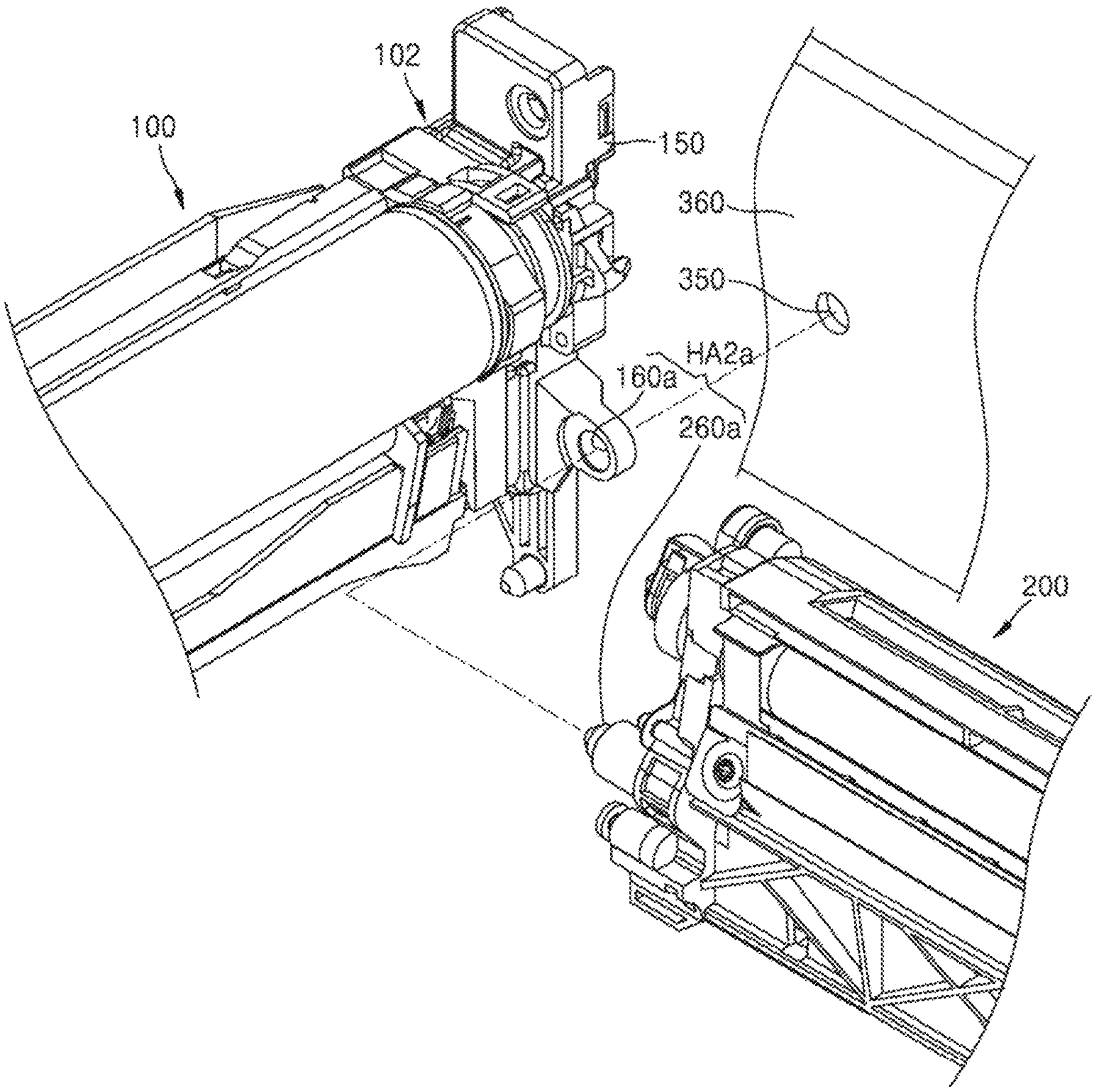
FIG. 8 is a partially exploded perspective view of a process cartridge according to an example.

In the aforementioned example, the non-driving-side hinge HA2 has been described as a hinge without a spacing, but the non-driving-side hinge HA2 may also have a spacing. FIG. 8 is a partially exploded perspective view of the process cartridge 2 according to an example. Referring to FIG. 8, a non-driving-side hinge HA2*a* may include a second support hole 160*a* in the first non-driving end 102, e.g., the first non-driving side bracket 150, and a second support shaft 260*a* provided at the second non-driving end 202, e.g., the second non-driving side bracket 250. The second support shaft 260*a* may be inserted into the second support hole 160*a* to be pivotable. The non-driving-side hinge HA2*a* of the present example has a spacing. As an example, the spacing may be 0.1 mm or more. A difference between an inner diameter of the second support hole 160*a* and an outer diameter of the second support shaft 260*a* may be 0.2 mm or more. That is, the inner diameter of the second support hole 160*a* may be greater than the outer diameter of the second support shaft 260*a* by 0.2 mm or more. Accordingly, a spacing of 0.1 mm or more may be secured between the second support shaft 260*a* and the second support hole 160*a*. As an example, the spacing may be 0.6 mm or less. The difference between the inner diameter of the second support hole 160*a* and the outer diameter of the second support shaft 260*a* may be 1.2 mm or more. That is, the inner diameter of the second support hole 160*a* is not greater than the outer diameter of the second support shaft 260*a* by 1.2 mm or more. Accordingly, a spacing of 0.6 mm or less may be secured between the second support shaft 260*a* and the second support hole 160*a*. The second support shaft 260*a* may be a reference for determining a position of a non-driving end based on the process cartridge 2 being mounted on the main body 1. For example, as shown in FIG. 8, a position determining unit 350 may be provided in the main body 1. The position determining unit 350 may be, e.g., a position determining hole. The second support shaft 260*a* may be inserted into the position determining unit 350 through the second support hole 160*a*. The position determining unit 350 may be provided in a waste toner containing member 360 in which waste toner may be contained, the waste toner being removed from the photosensitive drum 11 by, e.g., the cleaning blade 13 and conveyed by the waste toner conveying member 14. The non-driving-side hinge HA2*a* may be coaxial with the driving-side hinge HA1. In other words, the first support hole 140 and the second support hole 160*a* may be coaxial, and the first support shaft 240 and the second support shaft 260*a* may be coaxial.

Figure 9:
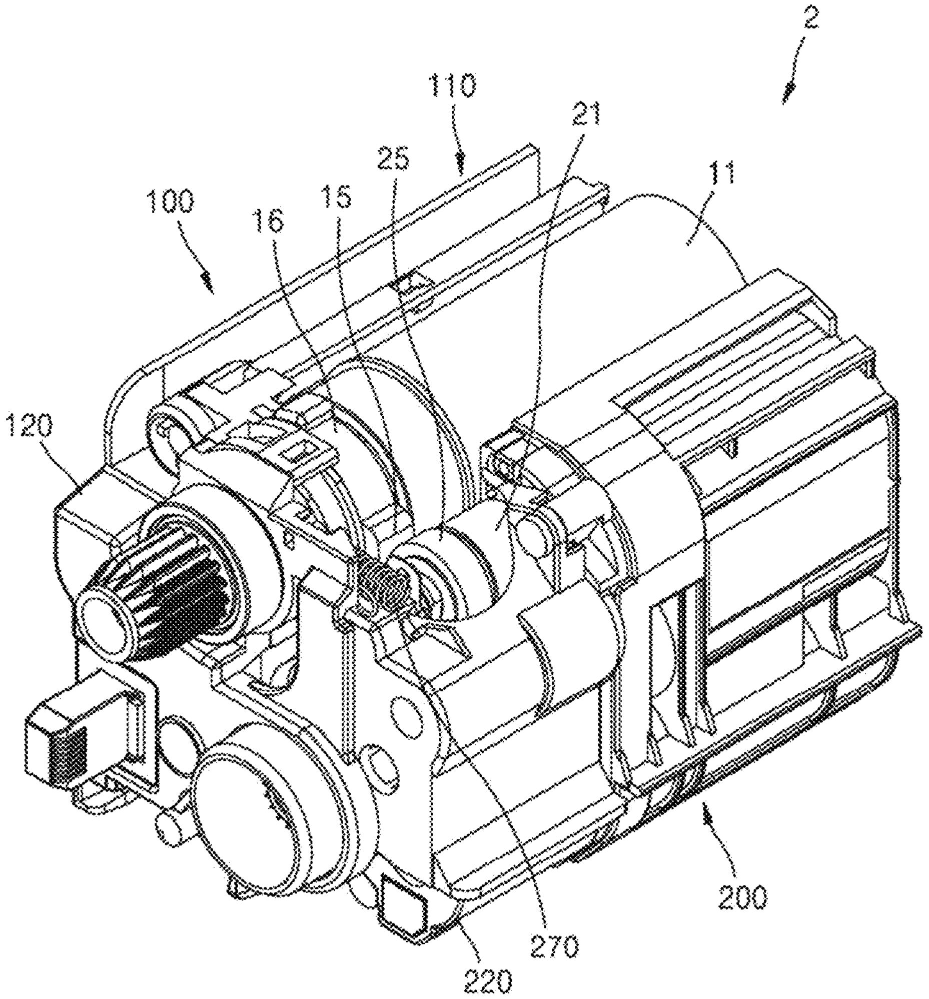
FIG. 9 is a partial perspective view of a developing gap maintenance structure according to an example.

The photosensitive drum 11 and the developing roller 21 may be spaced apart from each other by a developing gap. FIG. 9 is a partial perspective view of a developing gap maintaining structure according to an example. Referring to FIG. 9, as an example, the process cartridge 2 may include an elastic member 270 that elastically connects the photosensitive unit 100 to the developing unit 200 to be pivotable in a direction in which the developing roller 21 and the photosensitive drum 11 approach each other. For example, the elastic member 270 may be implemented by a tension coil spring whose one end and other end are connected to the first driving side bracket 120 and the second driving side bracket 220, respectively. A developing gap, i.e., a gap between the photosensitive drum 11 and the developing roller 21, may be maintained by a first gap maintaining member 15 and a second gap maintaining member 25. The first gap maintaining member 15 may be provided at each of two opposite ends of the photosensitive drum 11. For example, the first gap maintaining member 15 may be provided on a flange 16 that supports two opposite ends of the photosensitive drum 11 to be rotatable. The second gap maintaining member 25 may be provided at each of two opposite ends of the developing roller 21 to face the first gap maintaining member 15.

By an elastic force of the elastic member 270, the photosensitive unit 100 and the developing unit 200 may be pivoted in a direction in which the photosensitive drum 11 and the developing roller 21 approach each other. The first gap maintaining member 15 and the second gap maintaining member 25 may be in contact with each other. By an elastic force of the elastic member 270, the photosensitive unit 100 and the developing unit 200 may be maintained in a state in which the first gap maintaining member 15 and the second gap maintaining member 25 are in contact with each other, i.e., a state in which the photosensitive drum 11 and the developing roller 21 are spaced apart from each other by a developing gap.

In response to a discrepancy existing between a relative position of the photosensitive coupler 130 with respect to the first support shaft 240 and a relative position of the first driving coupler 310 with respect to the position determining unit 330, the photosensitive unit 100 may be moved with respect to the driving-side hinge HA1, e.g., the first support shaft 240, within a spacing-allowed range. According to an example process cartridge 2, even though the photosensitive unit 100 is moved with respect to the driving-side hinge HA1, e.g., the first support shaft 240, within the spacing-allowed range, the first gap maintaining member 15 and the second gap maintaining member 25 may be maintained in contact with each other by the elastic force of the elastic member 270, and thus, as shown in FIG. 7, the photosensitive drum 11 and the developing roller 21 may be maintained to be spaced apart from each other by the developing gap. Accordingly, the developing gap may be stably maintained, and stable image quality may be maintained.

Figure 10:
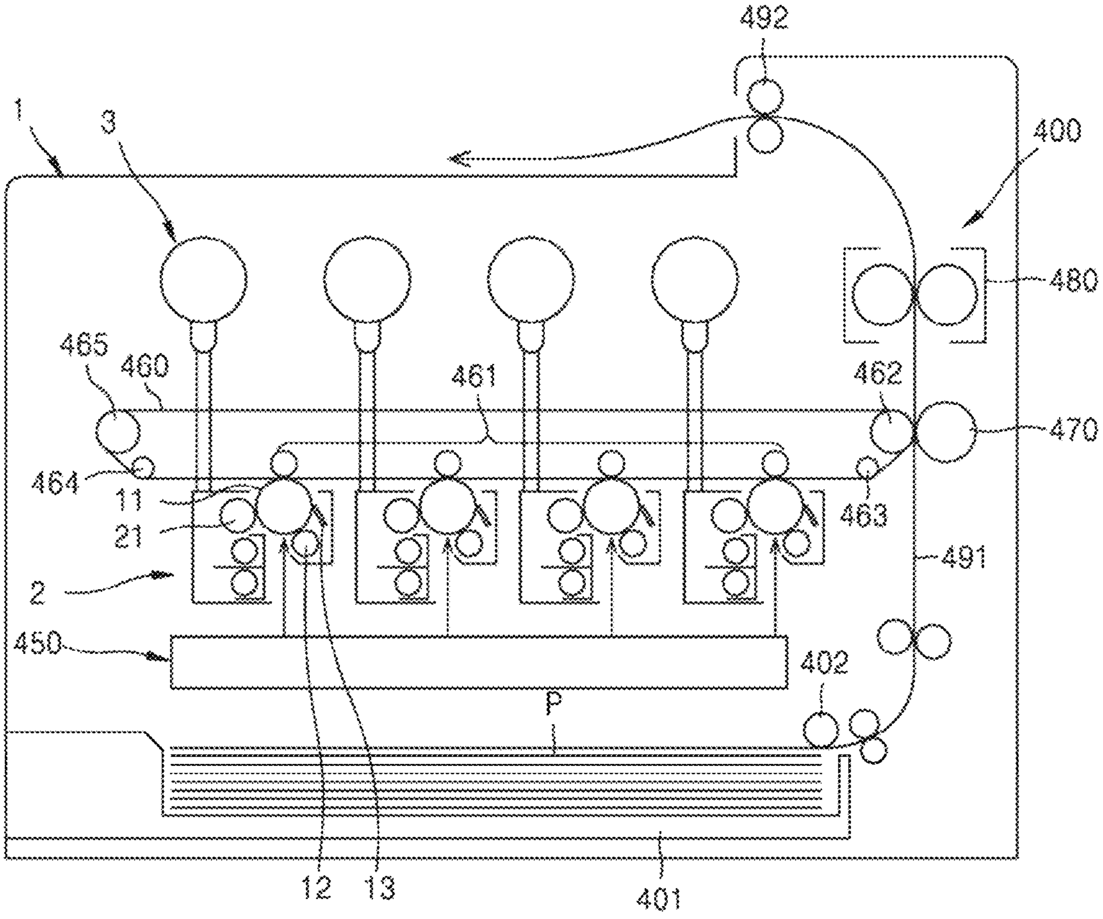
FIG. 10 is a schematic block diagram of an image forming apparatus according to an example.

FIG. 10 is a schematic block diagram of an image forming apparatus according to an example. Referring to FIG. 10, as an example, the image forming apparatus may include the main body 1 including a print portion 400, and a toner cartridge 3 in which toner to be supplied to the print portion 400 may be contained, the print portion 400 to supply toner to an electrostatic latent image formed on a photoconductor, e.g., the photosensitive drum 11, and to develop the electrostatic latent image. The print portion 400 may print an image on a print medium P by an electrophotographic method. In an example, the print portion 400 may print a color image on the print medium P by the electrophotographic method.

Referring to FIG. 10, the print portion 400 may include a plurality of process cartridges 2, an exposure unit 450, an intermediate transfer belt 460, a transfer roller 470, and a fixing unit 480. The plurality of process cartridges 2 may include four process cartridges 2 to form a toner image of yellow (Y), magenta (M), cyan (C), and black (K) colors. The four process cartridges 2 may contain developers, e.g., toners and carriers, of C, M, Y, and K colors, respectively. Four toner cartridges 3 may contain toners of Y, M, C, and K colors, respectively. The toners of Y, M, C, and K colors may be supplied from the four toner cartridges 3 to the four process cartridges 2, respectively. The process cartridge 2 may include the photosensitive drum 11 in which an electrostatic latent image may be formed on the surface thereof, and the developing roller 21. The process cartridge 2 may supply toner to the electrostatic latent image and develop the electrostatic latent image into a visible toner image.

The charging roller 12 is to charge the photosensitive drum 11 to have a uniform surface electric potential. The exposure unit 450 is to form an electrostatic latent image on the photosensitive drum 11 by irradiating light modulated in correspondence with image information to the photosensitive drum 11. The developing roller 21 may supply a developer contained in the process cartridge 2 to a developing gap opposite to the photosensitive drum 11. The toner may be supplied to the electrostatic latent image across the developing gap by a developing bias voltage applied to the developing roller 21, and the electrostatic latent image may be developed into a visible toner image. The intermediate transfer belt 460 may be supported by a plurality of support rollers 462, 463, 464, and 465 and circulated. Four intermediate transfer rollers 461 may be respectively arranged at positions facing photosensitive drums 11 of the four process cartridges 2 with the intermediate transfer belt 460 therebetween. A toner image developed on the photosensitive drum 11 may be intermediately transferred to the intermediate transfer belt 460 by an intermediate transfer bias voltage applied to an intermediate transfer roller 461. The cleaning blade 13 may remove residual developer on the surface of the photosensitive drum 11 after the intermediate transfer process. The transfer roller 470 may be positioned to face the intermediate transfer belt 460 and form a transfer nip. The print medium P may be picked up from a paper feed cassette 401 by a pickup roller 402 and supplied to the transfer nip along a path 491. The toner image on the intermediate transfer belt 460 may be transferred to the print medium P by a transfer bias voltage applied to the transfer roller 470. The fixing unit 480 is to apply heat and pressure to the toner image transferred to the print medium P and fix the toner image to the print medium P. The print medium P on which printing is completed may be discharged by a discharge roller 492.

The plurality of process cartridges 2 may be attached to or detached from the main body 1. Each of the plurality of process cartridges 2 may have a configuration as shown in FIGS. 1 to 8. A plurality of position determining units 330 (see FIG. 4), a plurality of first driving couplers 310 (see FIG. 4), and a plurality of second driving couplers 320 (see FIG. 4), which respectively correspond to the plurality of process cartridges 2, and a driving motor 300 (see FIG. 4) that drives the aforementioned components may be provided in the main body 1. In an example, the position determining unit 350 (see FIG. 8) that determines a position of the non-driving-side hinge HA2 (see FIG. 8) may be provided in the main body 1.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A process cartridge comprising:

a photosensitive unit comprising a first driving end, a first non-driving end, and a photosensitive drum;

a developing unit comprising a second driving end corresponding to the first driving end, a second non-driving end corresponding to the first non-driving end, and a developing roller;

a developing coupler provided at the second driving end and connected to the developing roller;

a hinge to connect the developing unit to the photosensitive unit to be pivotable between a direction in which the developing roller approaches the photosensitive drum and a position in which the developing roller separates from the photosensitive drum, wherein the hinge comprises a driving-side hinge to connect the first driving end to the second driving end to be pivotable, wherein the driving-side hinge has a spacing, and wherein the driving-side hinge is coaxial with the developing coupler.

2. The process cartridge of claim 1, wherein the driving-side hinge comprises:

a first support hole in the first driving end; and a first support shaft having a cylindrical shape surrounding the developing coupler, provided at the second driving end, and inserted into the first support hole to be pivotable.

3. The process cartridge of claim 1, wherein the driving-side hinge has a spacing of about 0.1 mm to about 0.6 mm.

4. The process cartridge of claim 1, wherein the hinge comprises a non-driving-side hinge to connect the first non-driving end to the second non-driving end to be pivotable, and wherein the non-driving-side hinge has no spacing.

5. The process cartridge of claim 4, wherein the driving-side hinge is coaxial with the non-driving-side hinge.

6. The process cartridge of claim 1, further comprising a photosensitive coupler provided at the first driving end and connected to the photosensitive drum.

7. The process cartridge of claim 1, further comprising:

an elastic member to apply an elastic force to the developing unit to be pivotable in the direction in which the developing roller approaches the photosensitive drum;

a first gap maintaining member provided at each of two opposite ends of the photosensitive drum; and a second gap maintaining member provided at each of two opposite ends of the developing roller, and facing the first gap maintaining member to maintain a gap between the photosensitive drum and the developing roller.

8. A process cartridge comprising:

a photosensitive unit comprising a first driving end, a first non-driving end, and a photosensitive drum, wherein a photosensitive coupler is provided at the first driving end;

a developing unit comprising a second driving end corresponding to the first driving end, a second non-driving end corresponding to the first non-driving end, and a developing roller, wherein a developing coupler is provided at the second driving end;

a driving-side hinge to connect the first driving end to the second driving end to be pivotable, the driving-side hinge being coaxial with the developing coupler; and a non-driving-side hinge to connect the first non-driving end to the second non-driving end to be pivotable, wherein the driving-side hinge has a spacing, and the non-driving-side hinge does not have a spacing.

9. The process cartridge of claim 8, wherein the driving-side hinge comprises:

a first support hole in the first driving end; and a first support shaft having a cylindrical shape surrounding the developing coupler, provided at the second driving end, and inserted into the first support hole to be pivotable, wherein a difference between an inner diameter of the first support hole and an outer diameter of the first support shaft is about 0.2 mm to about 1.2 mm.

10. The process cartridge of claim 8, wherein the driving-side hinge is coaxial with the non-driving-side hinge.

11. An image forming apparatus comprising:

a main body comprising a first driving coupler, a second driving coupler, and a position determining unit, the position determining unit being coaxial with the second driving coupler; and a process cartridge detachably coupled to the main body, wherein the process cartridge comprises:

a photosensitive unit comprising a first driving end, a first non-driving end, and a photosensitive drum, wherein a photosensitive coupler connectable to the first driving coupler is provided at the first driving end;

a developing unit comprising a second driving end corresponding to the first driving end, a second non-driving end corresponding to the first non-driving end, and a developing roller, wherein a developing coupler connectable to the second driving coupler is provided at the second driving end;

a driving-side hinge to connect the first driving end to the second driving end to be pivotable, the driving-side hinge being coaxial with the developing coupler; and a non-driving-side hinge to connect the first non-driving end to the second non-driving end to be pivotable, wherein the driving-side hinge has a spacing, and wherein, in a case where the process cartridge is mounted on the main body, the driving-side hinge is aligned with the position determining unit.

12. The image forming apparatus of claim 11, wherein the driving-side hinge comprises a first support hole in the first driving end, and a first support shaft provided at the second driving end and inserted into the first support hole to be pivotable, wherein the first support shaft has a cylindrical shape and is coaxial with the developing coupler, and wherein the position determining unit comprises a position determining hole coaxial with the second driving coupler and the first support shaft is inserted into the position determining hole.

13. The image forming apparatus of claim 11, wherein the driving-side hinge is coaxial with the non-driving-side hinge.

14. The image forming apparatus of claim 11, further comprising:

an elastic member to apply an elastic force to the developing unit to be pivotable in a direction in which the developing roller approaches the photosensitive drum;

a first gap maintaining member provided at each of two opposite ends of the photosensitive drum; and a second gap maintaining member provided at each of two opposite ends of the developing roller, and facing the first gap maintaining member to maintain a gap between the photosensitive drum and the developing roller.

* * * * *